US010685384B2

(12) United States Patent
Kemp et al.

(10) Patent No.: US 10,685,384 B2
(45) Date of Patent: Jun. 16, 2020

(54) METHODS AND SYSTEMS FOR TRACKING A PRICE CHANGE FOR A PURCHASE MADE USING A TRANSACTION CARD

(75) Inventors: Donald W. Kemp, O'Fallon, MO (US); Christopher P. Aguas, Weston, CT (US); Brian O'Neale Bettinger, Jersey City, NJ (US); Thomas G. Romary, Mercer Island, WA (US); Hugh Herrick Birch, Woodinville, WA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 904 days.

(21) Appl. No.: 13/345,448

(22) Filed: Jan. 6, 2012

(65) Prior Publication Data

US 2012/0226570 A1 Sep. 6, 2012

Related U.S. Application Data

(60) Provisional application No. 61/430,402, filed on Jan. 6, 2011.

(51) Int. Cl.
*G06Q 30/00* (2012.01)
*G06Q 30/06* (2012.01)
*G06Q 50/14* (2012.01)

(52) U.S. Cl.
CPC ......... *G06Q 30/0623* (2013.01); *G06Q 50/14* (2013.01)

(58) Field of Classification Search
CPC ................................................ G06Q 30/00–08
USPC .............................................. 705/26.1–27.2
See application file for complete search history.

(56) References Cited

U.S. PATENT DOCUMENTS

| 7,363,242 | B2 | 4/2008 | Lewis et al. |
| 7,966,213 | B2 | 6/2011 | Messa et al. |
| 2002/0013718 | A1* | 1/2002 | Cornwell .......................... 705/5 |
| 2004/0078464 | A1 | 4/2004 | Rajan et al. |
| 2005/0203782 | A1 | 9/2005 | Smith |
| 2006/0265361 | A1* | 11/2006 | Chu .................................. 707/3 |
| 2008/0167908 | A1 | 7/2008 | Marcken |
| 2008/0167910 | A1 | 7/2008 | De Marcken |

(Continued)

OTHER PUBLICATIONS

Priceline.com Promotion Offers New Pricedrop Protection for Airline Tickets and Vacation Packages. Anonymous . Business Wire ; New York [New York]Mar. 19, 2009. <Retrieved via ProQuest> (Year: 2009).*

*Primary Examiner* — Michael Misiaszek
(74) *Attorney, Agent, or Firm* — Armstrong Teasdale LLP

(57) ABSTRACT

A computer-based method and system for tracking a price change of a purchase made using a transaction card over an interchange network is provided. The interchange network includes a price tracking computer device in communication with a memory device. The method includes receiving, at the interchange network, transaction data associated with a purchase of an item by a cardholder using the transaction card, transmitting via the interchange network an authorization message in response to the purchase of the item, directing at least some of the transaction data to the price tracking computer device including a purchase price of the item, and using the price tracking computer device to track changes in a current asking price of the item, and compare the purchase price of the item to the current asking price of the item.

19 Claims, 8 Drawing Sheets

(56) References Cited

U.S. PATENT DOCUMENTS

| | | |
|---|---|---|
| 2008/0208606 A1 | 8/2008 | Allsop et al. |
| 2008/0208817 A1 | 8/2008 | Allsop et al. |
| 2008/0209318 A1 | 8/2008 | Allsop et al. |
| 2009/0018906 A1 | 1/2009 | Bous |
| 2009/0287596 A1 | 11/2009 | Torrenegra |
| 2010/0010841 A1 | 1/2010 | Cooper et al. |
| 2011/0055231 A1* | 3/2011 | Huck et al. .................. 707/751 |
| 2011/0161351 A1* | 6/2011 | Allsop et al. ................ 707/769 |

* cited by examiner

METHODS AND SYSTEMS FOR TRACKING A PRICE CHANGE FOR A PURCHASE MADE USING A TRANSACTION CARD

CROSS-REFERENCE TO RELATED APPLICATIONS

This application claims the benefit of U.S. provisional Application No. 61/430,402, filed Jan. 6, 2011, which is hereby incorporated by reference.

BACKGROUND OF THE INVENTION

The embodiments described herein relate generally to systems and methods for tracking price changes for a purchase made using a transaction card and, more particularly, to systems and methods for tracking a subsequent reduction in price of a purchase made by a cardholder using a transaction card, and compensating the cardholder by providing, or arranging for the provision of, an item of value to the cardholder valued at least a portion of the price reduction.

At least some known items and/or services that might be purchased with a transaction card have fluctuating and/or volatile prices based on market conditions, supply, demand, and/or other market factors. For example, the price of an airline ticket can change daily or hourly. As such, cardholders attempt to time their purchases of such items and/or services to obtain the lowest price for the item and/or service. However, after such an item and/or service is purchased, the price can drop, which can be frustrating to the cardholder.

Continuing the above example, at least some known domestic airline carriers have guaranteed airfare rules and/or policies that enable travelers to benefit from a fare change in some circumstances. More specifically, in a contract of carriage, the airline carrier can provide that a traveler can receive compensation in the amount of a difference between a purchase price and a subsequent lower price, less any applicable fees, such as a change fee, if the traveler specifically requests the compensation. The compensation can be in the form of a credit or refund depending on the carrier's policy and/or fare class. Typically, credits for the difference can be used within twelve months of the original purchase as payment for another flight with that carrier for that traveler. However, many travelers are unaware of such guaranteed airfare policies, are not familiar with the complexities of at least some guaranteed price policies, do not continuously track the price of a purchased flight, and/or are reluctant to attempt to make a request for compensation.

Some known travel aggregation websites offer price assurances to travelers purchasing travel through these websites. However, when a traveler purchases travel through such a website, rather than directly through the carrier, the guaranteed airfare policies may not apply. Further, such aggregator-offered credits and/or refunds may only be offered if another traveler purchases the same travel through the website at a lower price. In contrast, the guaranteed airfare policies are not limited to airfare actually purchased by another traveler. Rather, under the guaranteed airfare policies, the compensation for the difference is available when there is a price decrease, even if there are no purchases made at the lower price. As such, although travel aggregation websites may offer some form of price assurance, compensation for price changes may be more limited than under the guaranteed airfare policies.

Accordingly, it is desirable to have a system and process for automatically tracking price reductions in goods or services, such as airline tickets, purchased by a cardholder, and automatically compensating, or arranging for compensation of, the cardholder when the purchase price subsequently decreases a predetermined amount by providing the cardholder with an item of value equal to at least a portion of the price reduction.

BRIEF DESCRIPTION OF THE INVENTION

In one aspect, a computer-based method for tracking a price change of a purchase made using a transaction card over an interchange network is provided. The interchange network includes a price tracking computer device in communication with a memory device. The method includes receiving, at the interchange network, transaction data associated with a purchase of an item by a cardholder using the transaction card, transmitting via the interchange network an authorization message in response to the purchase of the item, directing at least some of the transaction data to the price tracking computer device including a purchase price of the item, and using the price tracking computer device to track changes in a current asking price of the item, and compare the purchase price of the item to the current asking price of the item.

In another aspect, a computer for tracking a price change of a purchase made using a transaction card over an interchange network is provided. The computer is in communication with a memory device and the interchange network. The computer is configured to receive transaction data from the interchange network, wherein the transaction data is associated with a purchase of an item by a cardholder using the transaction card over the interchange network, and the transaction data includes a purchase price of the item. The computer is further configured to track changes in a current asking price of the item, and compare the purchase price of the item to each of the current asking prices of the item as the current asking price of the item changes over time.

In another aspect, a network-based system for tracking a price change of an item purchased by a cardholder using a transaction card over an interchange network is provided. The network-based system includes a data warehouse for storing transaction data, an interchange computing device in communication with the data warehouse, and a price tracking computing device in communication with the data warehouse. The price tracking computing device is configured to receive, from the interchange computing device, transaction data associated with the purchase of the item by the cardholder using the transaction card wherein the transaction data includes a purchase price of the item, track changes in a current asking price of the item over a period of time, and compare the purchase price of the item to the current asking price of the item over the period of time.

In yet another aspect, one or more computer-readable media having computer-executable instructions embodied thereon is provided. When executed by a computer device, the computer-executable instructions cause the computer device to receive transaction data associated with a purchase of an item made by a cardholder using a transaction card over an interchange network, transmit an authorization message in response to the purchase of the item, track changes in a current asking price of the item over a period of time, and compare the purchase price of the item to the current asking price of the item over the period of time.

In another aspect, a computer-based method for tracking a price of a purchase made using a transaction card over an interchange network. The interchange network includes a transaction and tracking computer system in communication with a data warehouse and a price tracking computer system. The method includes providing a list of enrolled cardholders to a price tracking computer system and authorizing a purchase of an item and/or service by an enrolled cardholder using the transaction card. The enrolled cardholder is included on the list of enrolled cardholders. The method further includes receiving at least partial transaction data associated with the purchased item and/or service at the data warehouse via the transaction and tracking computer system, transmitting the list of enrolled cardholders from the price tracking computer system to the data warehouse via a data exchange computer system, and extracting transaction data for the enrolled cardholder from the data warehouse based on the list of enrolled cardholders. The extracted transaction data is transmitted to the price tracking computer system, and a price of the purchased item and/or service is tracked based on the transaction data received at the price tracking computer system.

In another aspect, a computer for tracking a price of a purchase of an item and/or service made using a transaction card is provided. The purchase of the item and/or service is made by an enrolled cardholder using the transaction card, and the enrolled cardholder is included on a list of enrolled cardholders. The computer is in communication with a data warehouse and a price tracking computer system via a data exchange computer system. The computer is configured to receive at least partial transaction data associated with the purchase of the item and/or service, receive the list of enrolled cardholders from the price tracking computer system via the data exchange computer system, extract transaction data for the enrolled cardholder from the data warehouse based on the list of enrolled cardholders, and transmit the extracted transaction data to the price tracking computer system for tracking a price of the purchased item and/or service based on the transaction data.

In yet another aspect, a network-based system for tracking a price of a purchase of an item and/or service made using a transaction card associated with an interchange network is provided. The purchase of the item and/or service is made by an enrolled cardholder included on a list of enrolled cardholders. The network-based system includes a point-of-sale (POS) device and a data warehouse for storing data received by the interchange network. The data warehouse is in communication with a price tracking computer system via a data exchange computer system. The network-based system further includes a server system in communication with the POS device and the data warehouse, wherein the server system is associated with the interchange network. The server system is configured to receive at least partial transaction data associated with the purchase of the item and/or service, transfer the at least partial transaction data to the data warehouse, and receive the list of enrolled cardholders from the price tracking computer system via the data exchange computer system. The server system is configured to extract transaction data for the enrolled cardholder from the data warehouse based on the list of enrolled cardholders, and transmit the extracted transaction data to the price tracking computer system for tracking a price of the purchased item and/or service based on the transaction data.

BRIEF DESCRIPTION OF THE DRAWINGS

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary system in accordance with one embodiment of the present invention.

FIG. 3 is an expanded block diagram of an exemplary embodiment of a server architecture of a system in accordance with one embodiment of the present invention.

FIG. 4 illustrates an exemplary configuration of a client system shown in FIGS. 2 and 3.

FIG. 5 illustrates an exemplary configuration of a server system shown in FIGS. 2 and 3.

FIG. 6 is a schematic diagram illustrating data flow of an exemplary transaction and tracking system implemented using the system shown in FIGS. 1-5.

FIG. 7 is a flow diagram illustrating an exemplary method performed using the transaction and tracking system shown in FIG. 6.

FIG. 8 is a flow diagram illustrating an alternative method performed using the transaction and tracking system shown in FIG. 6.

DETAILED DESCRIPTION OF THE INVENTION

Figure 1:
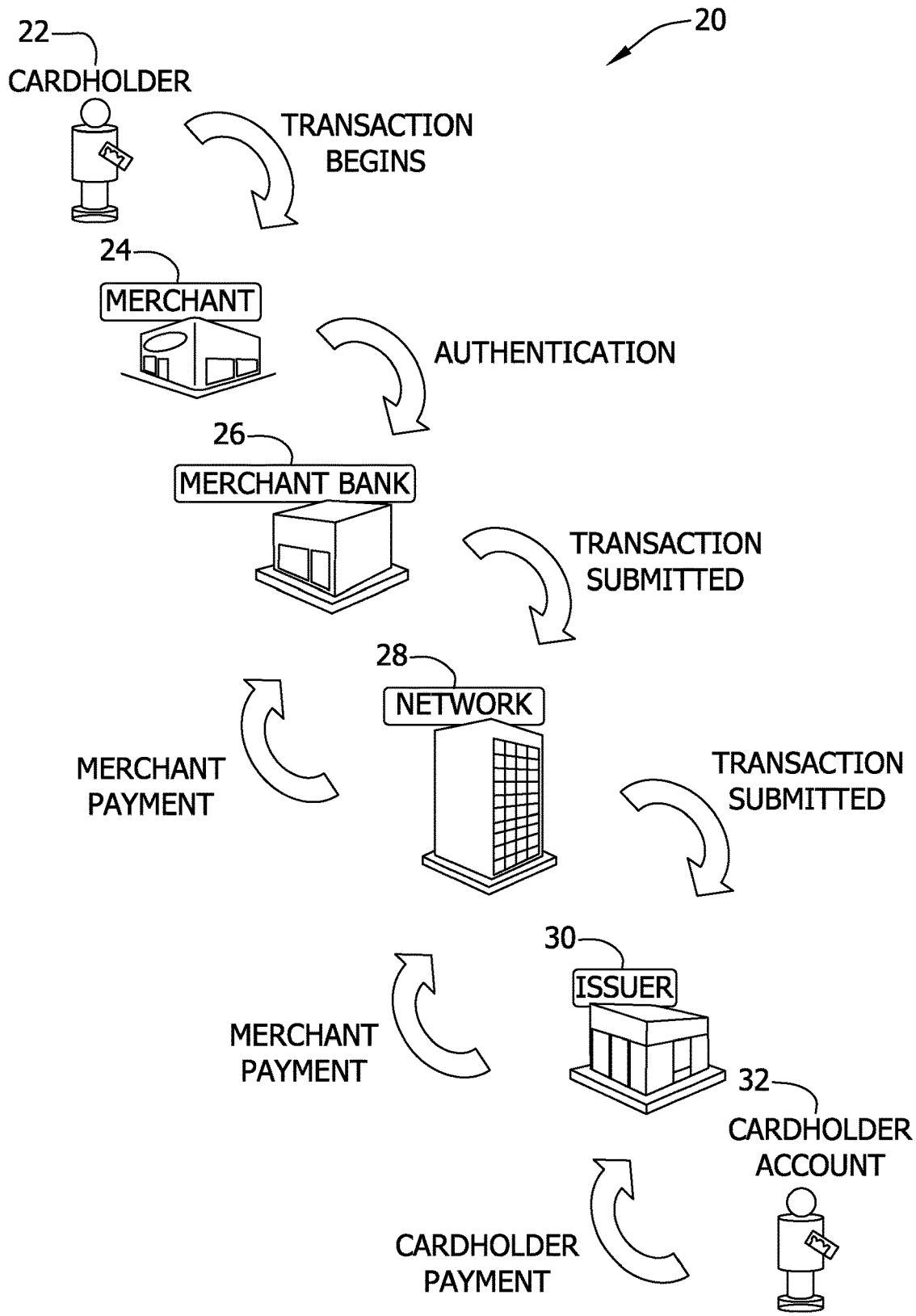
FIGS. 1-8 show exemplary embodiments of the systems and methods described herein.

The embodiments described herein facilitate tracking a price of a purchase made using a transaction card to enable a cardholder to benefit from a price decrease for an item and/or service purchased. More specifically, when a cardholder purchases travel and the price of the travel subsequently decreases, the herein-described embodiments enable the cardholder to benefit from the subsequently lower price. For example, the embodiments described herein monitor a price for purchased airfare, alert a cardholder when the price of the airfare decreases a predetermined amount, and facilitates requesting compensation for at least a portion of the price decrease under the guaranteed airfare policies. As such, the cardholder does not need to monitor the price of the purchased airfare and/or contact the airline carrier for the compensation. Rather, the system and methods described herein automatically track and/or monitor the price of travel purchased using a transaction card, alert the cardholder to price decreases, and provide a concierge to assist the cardholder in requesting compensation and/or rebooking travel.

As used herein, a credit and/or refund are included in the term "repurchasing credit" which can be given to a cardholder as compensation for the repurchasing or rebooking of an item or service. Repurchasing credit can be a full credit of any monies owed, a partial credit of monies owed, or some other value provided to the cardholder.

Although one example of a transaction made using the systems described herein is the purchase and subsequent price tracking of travel, it should be understood that the systems described herein can be used with any suitable transaction. For example, the embodiments described herein can be used when an item and/or service having a fluctuating characteristic, such as price, is purchased using a transaction card and the merchant or other provider has a guarantee regarding the fluctuating characteristic. As used herein, the term "item" refers to the purchase of goods and/or services. Included in the term "item" is the purchase of goods and/or services relating to travel, such as the purchasing of airfare, a hotel stay, a car rental, a train fare, a bus fare, or any other form of transportation. In other words, the purchasing of airfare may be referred to as purchasing an item or a service. Another example of a transaction that could be tracked with the system described herein is the purchase of consumer electronics where the merchant has a guarantee regarding price changes of the consumer electronics subsequent to the purchase thereof.

When an item and/or service is purchased by a cardholder, transaction data is generated. Typically, transaction data sent to a data warehouse by an interchange network is stored in the data warehouse for a predetermined time period and/or on a first-in-first-out basis. However, the embodiments described herein extract certain transaction data from the data warehouse for tracking price fluctuations of the item and/or service purchased as part of the transaction conducted via the interchange network. More specifically, when a cardholder purchases an item and/or service prone to subsequent price decreases, such as airfare, lodging, a rental car, and/or other travel purchases, transaction data related to the purchase is extracted from the data warehouse for price monitoring and/or tracking.

In the exemplary embodiment, the data warehouse receives data related to all purchases made using the interchange network, and only transaction data corresponding to purchases made using particular cardholder accounts is extracted from the data warehouse. The extracted transaction data is transmitted to a third party or to a monitoring platform of the interchange network to track price fluctuations of the purchased item and/or service, such as travel. When the price decreases to a predetermined level, such as a level below a predetermined change threshold, an alert is sent to the cardholder who made the purchase. The cardholder can then take advantage of the price decrease by rebooking travel at the lower price, receiving a credit, receiving a refund, and/or performing any other suitable steps. As such, the embodiments described herein take advantage of market conditions and/or existing rules and/or policies to facilitate ensuring that a cardholder receives the lowest price for a fluctuating-price item and/or service, such as airfare.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIXO server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in industrial, commercial, and residential applications. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased.

Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a data warehouse 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to data warehouse 120.

As used herein, the term "transaction data" refers to data that includes at least a portion of a cardholder's account information (i.e. cardholder name, account number, credit line, security code, and/or expiration data) and at least a portion of purchase information (i.e. price, a type of item and/or service, SKU number, item/service description, purchase date, and/or confirmation number) supplied by a merchant from which the cardholder is making a purchase. A type of transaction data is itinerary data. As used herein, the terms "itinerary data" and/or "travel data" refer to data regarding a travel purchase using a transaction card, such as a flight number, a ticket number, a confirmation number, at least one date, an origin or destination location code, an address, a carrier's name, a hotel's name, a rental car company's name, a price or charge, and/or any other suitable information related to the travel purchased by cardholder 22 using a transaction card. In the exemplary embodiment, when cardholder 22 is a commercial cardholder, such as a business entity, a full itinerary for the purchased travel is transmitted to interchange network 28 during the clearing process. When cardholder 22 is a private individual cardholder, such as a person, only a portion of an itinerary for the purchased travel, such as one leg of a set of flights, is transmitted to interchange network 22. Alternatively, any suitable amount of itinerary data is transmitted to interchange network 28 for commercial and/or individual cardholders.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
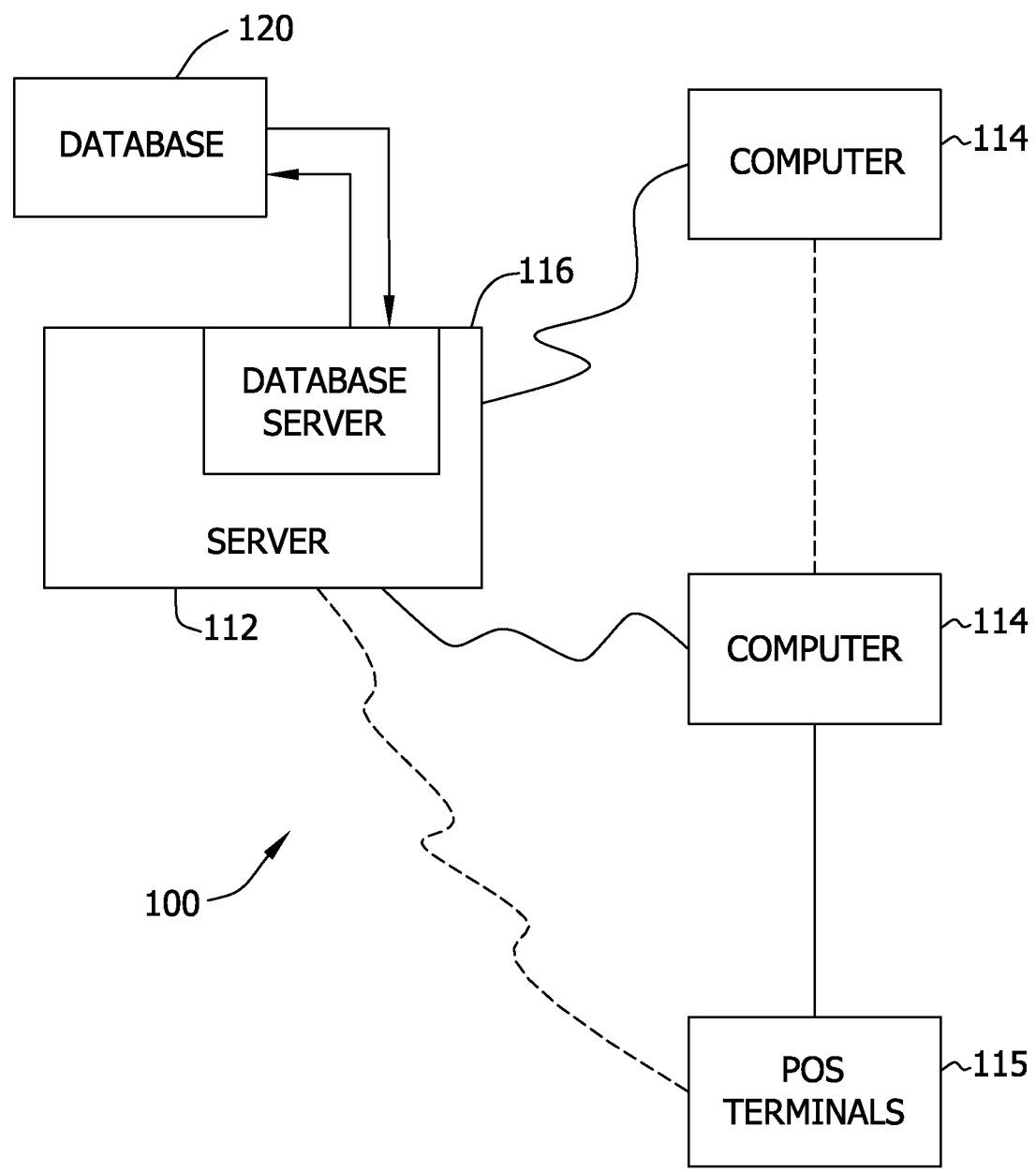

FIG. 2 is a simplified block diagram of an exemplary transaction and tracking system 100 for processing payment-by-card transactions and tracking price changes in items and/or service purchased, in accordance with one embodiment of the present invention. In the exemplary embodiment, system 100 is used to implement multi-party transaction card industry system 20 (shown in FIG. 1). In one embodiment, system 100 is a transaction card system, also referred to as a financial transaction payment system, used for storing transaction data of users, within a transaction card program used by a cardholder. System 100 is a transaction card system configured to process a transaction initiated by a cardholder using a transaction card, determine whether the cardholder engaging in the transaction is registered within the system, store the data related to the transaction, authorize or deny the transaction, clear the transaction, settle the transaction, and otherwise complete the transaction. In addition, system 100 is configured to track price changes in items and/or services purchased by a cardholder, as described below in greater detail.

In the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 115, which are connected to client systems 114 and may be connected to server system 112. POS terminals 115 are interconnected to the Internet through many interfaces including a network, such as a LAN or a WAN, dial-in-connections, cable modems, wireless modems, and special high-speed ISDN lines. POS terminals 115 could be any device capable of interconnecting to the Internet and including an input device capable of reading information regarding a cardholder's financial transaction card.

A database server 116 is connected to a database 120, also known as a memory device, which includes information on a variety of matters, as described below in greater detail. Database 120 is also referred to herein as a "data warehouse". In one embodiment, centralized database 120 is stored on server system 112 and can be accessed by potential users at one of client systems 114 by logging onto server system 112 through one of client systems 114. In an alternative embodiment, database 120 is stored remotely from server system 112 and/or may be non-centralized.

Database 120 may store information related to cardholders and/or transaction data generated as part of sales activities conducted over interchange network 28, including data relating to merchants, account holders or consumers, purchases, a name of a cardholder, an account number, a transaction history, and other cardholder-related information. For example, database 120 stores itinerary information associated with travel purchases made using transaction cards. Database 120 may also store data relating to a list of cardholders participating in programs with interchange network 28 (shown in FIG. 1); merchant identifiers; product codes; transaction terms; financing data; interchange rate data for different types of transactions performed over the interchange network; rewards program data for different rewards programs offered by the issuer or the interchange network; and/or any data related to operation of system 100. Database 120 may include a single database having separated sections or partitions or may include multiple databases, each being separate from each other.

In the example embodiment, one of client systems 114 may be associated with acquirer bank 26 (shown in FIG. 1) while another one of client systems 114 may be associated with issuer bank 30 (shown in FIG. 1). POS terminal 115 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS 115 may include a computer system associated with at least one of an online bank, a bill payment outsourcer, an acquirer bank, an acquirer processor, an issuer bank associated with a transaction card, an issuer processor, a remote payment system, a biller, and/or a price tracking system. The price tracking system may be associated with interchange network 28 or with an outside third party in a contractual relationship with interchange network 28. Accordingly, each party involved in processing transaction data are associated with a computer system shown in system 100 such that the parties can communicate with one another as described herein.

The embodiments illustrated and described herein as well as embodiments not specifically described herein but within the scope of aspects of the invention constitute exemplary means for monitoring a price of an item and/or service purchased using a transaction card, and more particularly, constitute exemplary means for monitoring a price of travel purchased using a transaction card. For example, server system 112 or client system 114, or any other similar computer device, programmed with computer-executable instructions to execute processes and techniques as described herein, constitutes exemplary means for monitoring a price of an item and/or service purchased using a transaction card.

Figure 3:
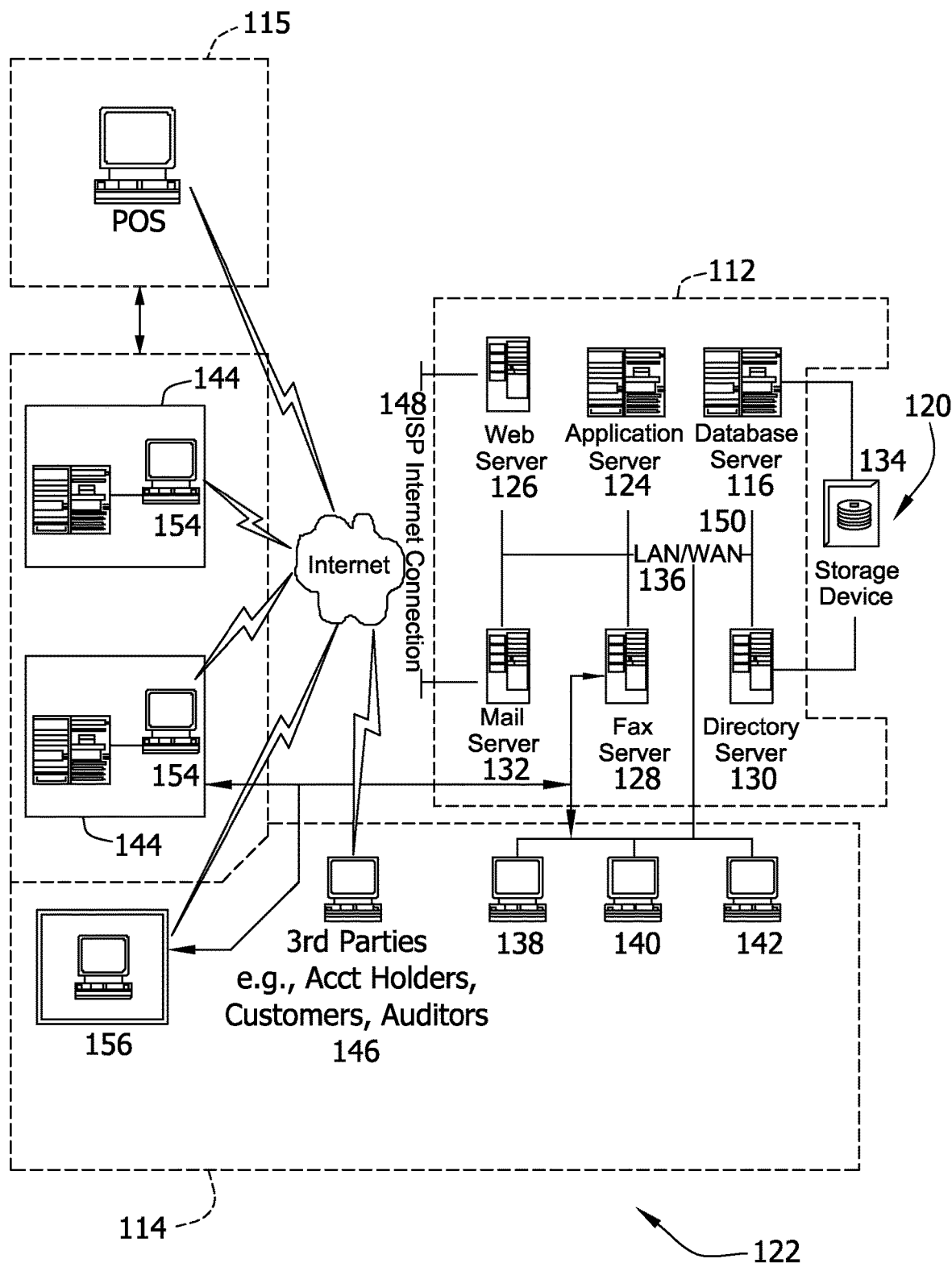

FIG. 3 is an expanded block diagram of an exemplary embodiment of a server architecture of a transaction and tracking system 122 for processing payment-by-card transactions and tracking price changes, in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 115. Server system 112 further includes database server 116, an application server 124, a web server 126, a fax server 128, a directory server 130, and a mail server 132. A storage device 134 is coupled to database server 116 and directory server 130. Storage device 134 is any computer-operated hardware for storing and/or retrieving data. In the exemplary embodiment, database 120 include storage device 134. Servers 116, 124, 126, 128, 130, and 132 are coupled in a LAN 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136. In the example embodiment, workstations 138, 140, and 142 may be associated with at least one of an online bank, an acquirer bank, an acquirer processor, an issuer bank associated with a transaction card, an issuer processor, and a merchant, such as a travel provider, an airline carrier, a hotel, a rental car company, and/or a consumer products merchant.

Server system 112 is configured to be communicatively coupled to various individuals, including employees 144 and to third parties, account holders, customers, auditors, etc., 146 using an ISP Internet connection 148. The communication in the exemplary embodiment is illustrated as being performed using the Internet, however, any other WAN-type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
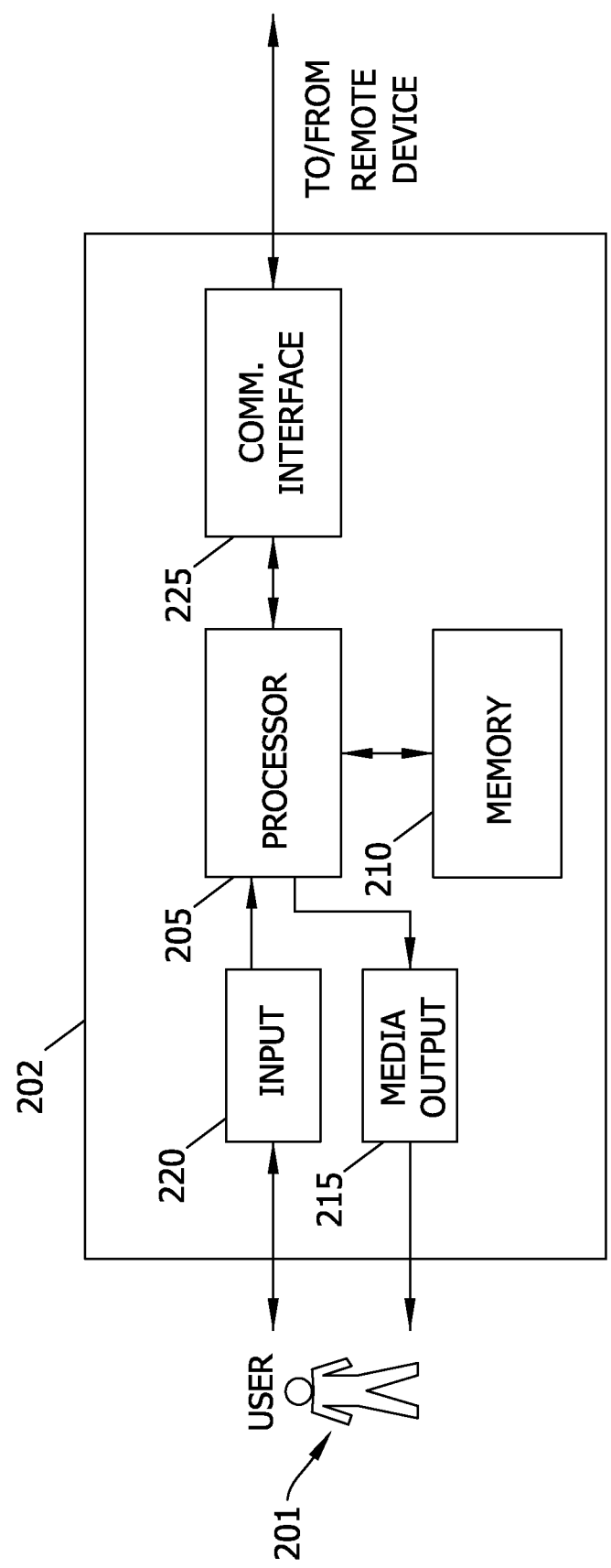

FIG. 4 illustrates an exemplary configuration of a user computing device 202 operated by a user 201, such as cardholder 22 (shown in FIG. 1). User computing device 202 may include, but is not limited to, client systems 114, 138, 140, and 142, POS terminal 115, workstation 154, and manager workstation 156. In the exemplary embodiment, user computing device 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user computing device 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User computing device 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface, such as user interface 412 (shown in FIG. 6), may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
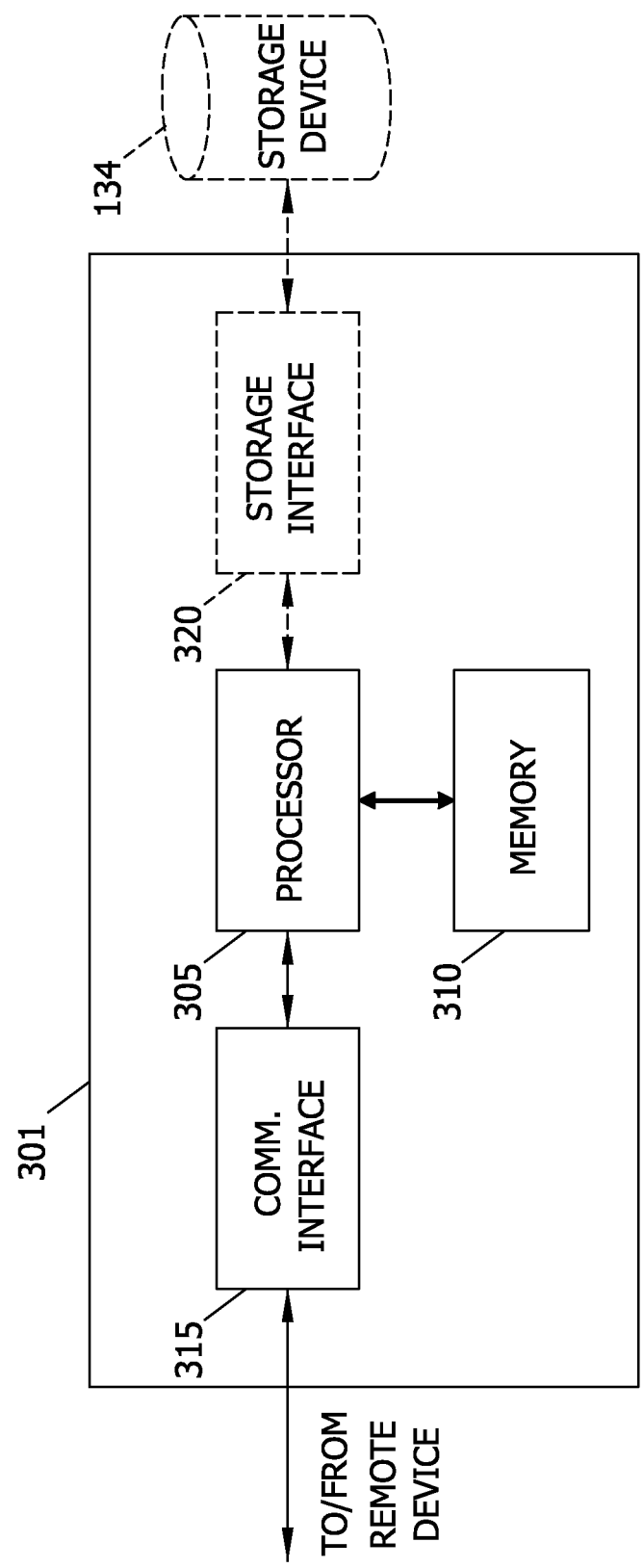

FIG. 5 illustrates an exemplary configuration of a server computing device 301 such as server system 112 (shown in FIG. 2). Server computing device 301 may include, but is not limited to, database server 116, application server 124, web server 126, fax server 128, directory server 130, and mail server 132. Server computing device 301 also includes a processor 305 for executing instructions. Instructions may be stored in a memory area 310, for example. Processor 305 may include one or more processing units, for example, a multi-core configuration. In the exemplary embodiment, processor 305 is operatively coupled to a communication interface 315 such that server computing device 301 is capable of communicating with a remote device such as user computing device 202 or another server computing device 301. For example, communication interface 315 may receive requests from user computing device 114 via the Internet, as illustrated in FIG. 3.

Processor 305 may also be operatively coupled to a storage device 134. Storage device 134 is any computer-operated hardware suitable for storing and/or retrieving data. In some embodiments, storage device 134 is integrated in server computing device 301. For example, server computing device 301 may include one or more hard disk drives as storage device 134. In other embodiments, storage device 134 is external to server computing device 301 and may be accessed by a plurality of server computing devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134. Referring to FIGS. 4 and 5, a software application may operate at least in part by exchanging data, such as requests and responses, between user computing device 202 and server computing device 301. For example, a "client side" software component executed by user computing device 202 may request data stored in storage device 134 and/or may initiate a transaction, such as a payment transaction, through server computing device 301.

Figure 6:
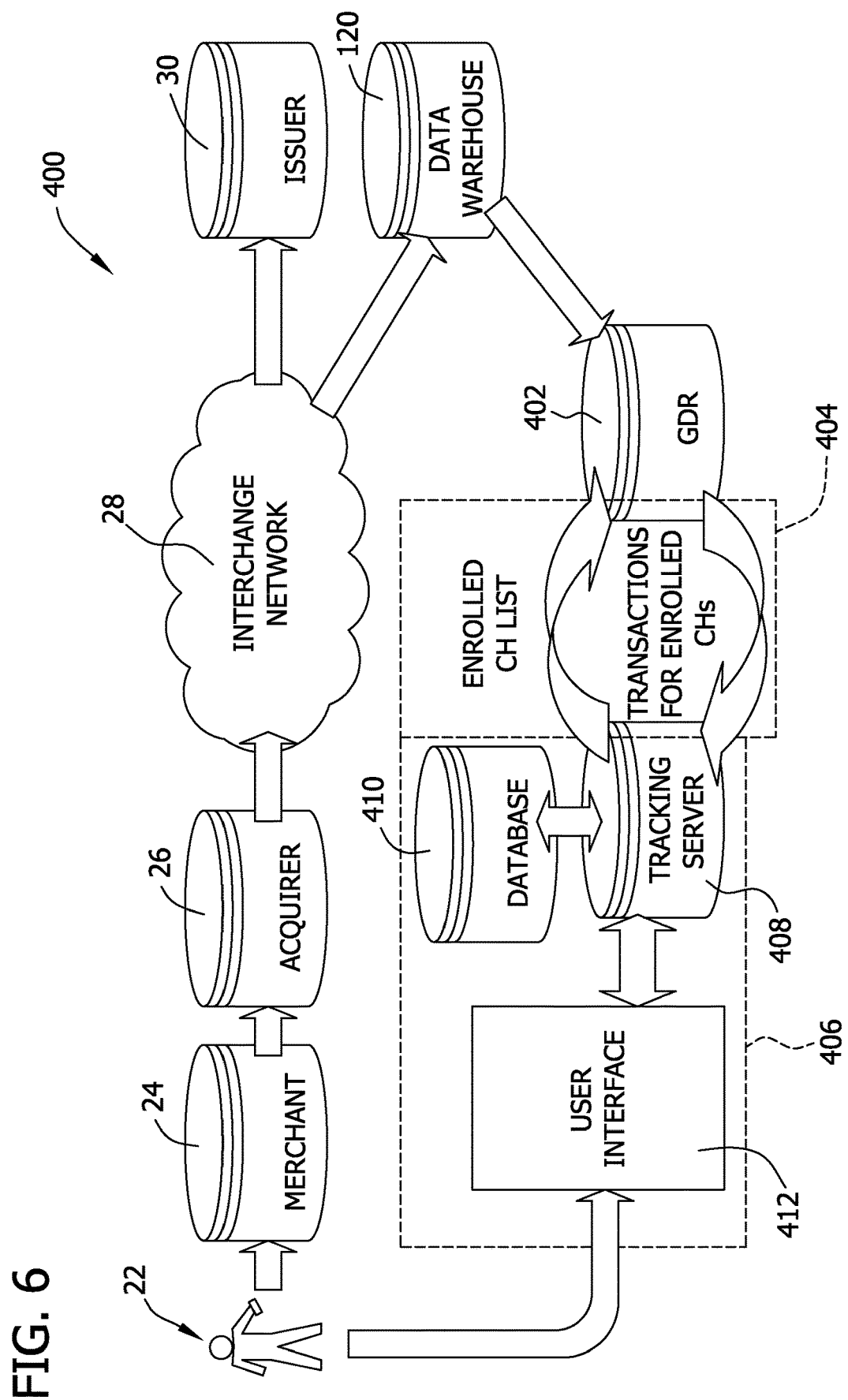

FIG. 6 is a schematic diagram illustrating data flow of an example embodiment of transaction and tracking system 100 and 122 (shown in FIGS. 2 and 3). This system embodiment shown in FIG. 6 is indicated by reference number 400. Transaction and tracking system 400 can be implemented using systems 20, 100, and/or 122 and/or devices 202 and/or 301 (shown in FIGS. 1-5). Components shown in FIG. 6 that are identical to components shown in FIGS. 1-5 are identified using the same reference numbers from FIGS. 1-5. Although a travel purchase is described with respect to FIGS. 6-8, it should be understood that transaction and tracking system 400, method 500 (shown in FIG. 7), and/or method 600 (shown in FIG. 8) can be used when any suitable item and/or service is purchased by cardholder 22, who has an account associated with issuer 30 and interchange network 28, and transaction data related to the purchase is transferred to interchange network 28.

Referring to FIG. 6, transaction and tracking system 400 includes a global data repository (GDR) 402, a data exchange system 404, and a price tracking system 406. GDR 402 is configured to receive predetermined data from data warehouse 120 and store and/or transmit the received data to price tracking system 406 via data exchange system 404. More specifically, when cardholder 22 purchases travel related items from merchant 24, such as an airline carrier, a rental car company, a hotel, a travel agent, and/or a travel website, itinerary data corresponding to the purchased travel items is extracted from data warehouse 120 and transmitted to GDR 402. GDR 402 is configured to store and/or transmit the received data and, as such, acts as a database for extracted itinerary data.

More specifically, all data related to a travel itinerary and/or other aspects of the travel items are extracted from data warehouse 120. In one embodiment, an algorithm is configured to identify and extract travel data. As such, all travel data is automatically transmitted from data warehouse 120 to GDR 402. In an alternative embodiment, GDR 402 includes a list of cardholders enrolled in a travel price tracking program. GDR 402 searches data warehouse 120 for travel itineraries for each cardholder on the list of enrolled cardholders. When GDR 402 finds a travel itinerary for an enrolled cardholder, GDR 402 extracts such data from data warehouse 120. It should be understood that all cardholders may also be considered to be enrolled cardholders. In the exemplary embodiment, travel data extraction and transmission is performed each time transactions are cleared using the clearing process, as described in more detail above.

Data exchange system 404 is configured to transfer data between GDR 402 and price tracking system 406. More specifically, when GDR 402 receives travel data from data warehouse 120, data exchange system 404 is configured to transfer a list of enrolled cardholders from price tracking system 406 to GDR 402 and transfer travel data for each enrolled cardholder from GDR 402 to price tracking system 406. In the exemplary embodiment, data exchange system 404 compares the travel data within GDR 402 to the list of enrolled cardholders to determine which travel data to transfer to price tracking system 406. When travel data is found in GDR 402 for an enrolled cardholder, the travel data is transferred to price tracking system 406. Alternatively, when GDR 402 extracts data for enrolled cardholders, rather than all cardholders, GDR 402 transfers extracted travel data to price tracking system 406 when price tracking system 406 sends a query via data exchange system 404. In the exemplary embodiment, price tracking system 406 receives at least partial itinerary data for each travel purchase made by an enrolled cardholder on the list of enrolled cardholders. The transfer of data between GDR 402 and price tracking system 406 can occur continually and/or periodically, such as occurring at the completion of each clearing process. In one embodiment, data exchange system 404 is operatively incorporated within GDR 402.

Price tracking system 406 includes a tracking server 408, a database 410, and a user interface 412. Tracking server 408 can be a server operated by a third party and/or a server operated by interchange network 28, and database 410 can be any suitable database. In the exemplary embodiment, tracking server 408 is configured to analyze itinerary data and travel merchant prices, or an asking price, to track and/or monitor price fluctuations of travel associated with the itinerary data. For example, when a flight on an airline is included in an itinerary of an enrolled cardholder, tracking server 408 is configured to compare the price paid for the flight with current prices for the flight as stated by the airline carrier. In the exemplary embodiment, when more than one form of travel is associated with an itinerary, price tracking system 406 is configured to monitor one or more travel merchants associated with the purchased travel for price fluctuations of each form of travel on the itinerary.

Tracking server 408 is configured to store received travel data in database 410 for analysis and/or retrieval. Once purchased travel has occurred (i.e. the cardholder has taken a purchased flight), past travel data is maintained within database 410 to form a history of travel for each enrolled cardholder. Alternatively, the corresponding travel data can be removed from database 410 once the purchased travel has been completed. In the exemplary embodiment, tracking server 408 and/or database 410 includes guaranteed price policies published by merchants. As such, tracking server 408 can refer to the terms for each merchant having a guaranteed price policy when determining a credit and/or a refund. User interface 412 is configured to be accessible to cardholder 22, such as via the Internet. User interface 412 is configured to enable cardholder 22 to enroll in a price tracking program, monitor purchased travel, respond to alerts issued by tracking server 408, modify and/or cancel purchased travel, and/or enter further data related to purchased travel, as described in more detail below. User interface 412 can be provided by tracking server 408, interchange network 28, and/or issuer 30.

To use system 400, cardholder 22, having a transaction card associated with interchange network 28, enrolls in the price tracking program via user interface 412 or other suitable user interface and/or via a representative of the third party, interchange network 28, and/or issuer 30. Once cardholder 22 is enrolled, tracking server 408 adds cardholder's 22 name, account number, and/or other suitable identifier to the enrolled cardholder list. As such, a list of enrolled users is provided to price tracking system 406 by self-enrollment of cardholders, by enrollment of cardholders by interchange network 28, issuer 30, and/or the third party, and/or by any other suitable means. Cardholder 22 purchases travel items from travel merchant 24 using a transaction card associated with interchange network 28. In one embodiment, cardholder 22 purchases travel items directly from a travel merchant, such as an airline carrier, a rental car company, and/or a hotel. In an alternative embodiment, cardholder 22 purchases travel items from travel merchant 24 via user interface 412. Alternatively, cardholder 22 purchases travel items from travel merchant 24 via a travel booking tool or service provided by interchange network 28.

During the clearing of the travel items purchased by cardholder 22, transaction data, including itinerary data, is transferred among parties to the transaction. More specifically, travel merchant 24 sends at least partial itinerary data to acquirer 26, which transfers the at least partial itinerary data to interchange network 28. Interchange network 28 transfers the itinerary data to issuer 30 and to data warehouse 120. It should be understood that such transaction data transfer can occur at any time during the transaction process and is not limited to being transferred during the clearing process. After data warehouse 120 receives itinerary data from merchant 24, itinerary data is extracted from data warehouse 120 and sent to GDR 402. When GDR 402 receives the enrolled cardholder list from price tracking system 406 via data exchange system 404, GDR 402 sends itinerary data corresponding to the travel items purchased by enrolled cardholder 22 to price tracking system 406 via data exchange system 404. Price tracking system 406 stores the itinerary data in database 410 and begins monitoring data published by travel merchant 24 corresponding to the travel items purchased by cardholder 22.

More specifically, tracking server 408 monitors published data or asking prices for decreases in the price of the travel items purchased by cardholder 22. In one embodiment, published data or asking prices are the travel prices published for particular items at a given time. When the price decreases, tracking server 408 determines a difference between the purchase price and the current asking price, and sends an alert, such as an email alert, an SMS text alert, an MMS alert, a telephone call, a message, and/or any other suitable type of alert, to cardholder 22. Used herein, the term "price difference" refers to a difference in price between a purchase price of an item and published data or an asking price of the same item. In the exemplary embodiment, travel merchant 24 charges a change fee for rebooking travel, and tracking server 408 sends an alert when the price decrease is greater than the change fee. Alternatively, tracking server 408 sends an alert to cardholder 22 based on any suitable criteria. In the exemplary embodiment, tracking server 408 can refer to merchants' guaranteed price policies to determine when a credit and/or refund is available and an amount of the credit and/or refund. Cardholder 22 accesses user interface 412 and/or contacts a travel concierge at the third party or at interchange network 28 in response to the alert. Cardholder 22 can then use user interface 412 and/or the concierge to rebook the travel and receive a credit or refund for the difference between the original purchase price and the current price. In one embodiment, the credit or refund is issued according to travel merchant's 24 price guarantee.

Figure 7:
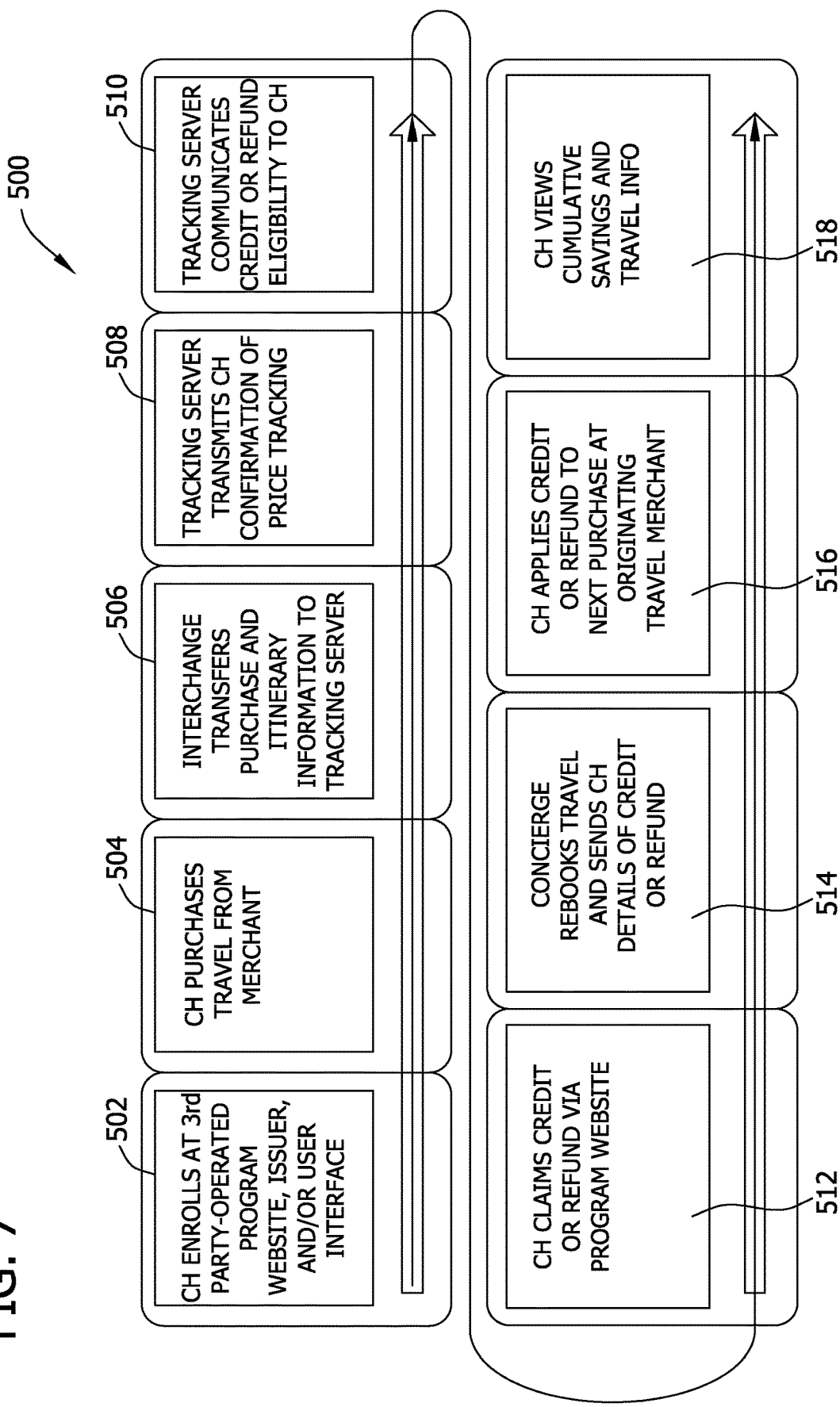

FIG. 7 is a flow diagram illustrating an exemplary method 500 performed using transaction and tracking system 400 (shown in FIG. 6). Method 500 can be used when a commercial cardholder, such as a business or other entity, is cardholder 22 (shown in FIGS. 1 and 6) and travel items are purchased. Such a cardholder 22 is referred to herein as commercial cardholder 22. Referring to FIGS. 6 and 7, method 500 includes enrolling 502 in the price tracking program at user interface 412, interchange network 28, issuer 30, and/or any other suitable user interface or representative. More specifically, cardholder 22 accesses user interface 412 and/or contacts a human representative to enroll 502 in the price tracking program. In one embodiment, user interface 412 includes a booking tool provided by interchange network 28. The booking tool can be used for enrolling 502 in the price tracking program and/or purchasing 504 travel items.

Enrolling 502 may include paying a fee to become a member of the price tracking program. The fee can be based on a predetermined period of time, such as year, and/or on a number of travel purchases to be made using the transaction card. Alternatively, the price tracking program may be included in the benefits of the level of the transaction card account and no fee is due for enrollment 502 in the price tracking program. In the exemplary embodiment, cardholder 22 purchases 504 travel items from merchant 24 using the transaction card. More specifically, cardholder 22 purchases 504 travel items from merchant 24 directly, through the third party, and/or through interchange network 28. The transaction is authorized and completed as described above.

As part of the transaction completion, for example, as a part of the clearing process, itinerary data related to the purchase 504 is transferred 506 from merchant 24 to acquirer 26, then to interchange network 28. In the exemplary embodiment, a complete itinerary for the purchased travel is transferred 506 during the completion of the transaction. For example, when commercial cardholder 22 purchases a round-trip flight and pays for the airfare using the transaction card, an itinerary for the outgoing leg of the flight and an itinerary for the return flight are transferred 506 as itinerary data during the clearing process. Each itinerary includes a purchase price, a flight number, a confirmation number, a departure time, an arrival time, a carrier name, and/or other information related to each flight. When other types of travel items are purchased 504, itinerary data includes information appropriate to the type of travel items purchased 504. After itinerary data is transferred 506 to interchange network 28, the itinerary data is transferred 506 to issuer 30 and/or data warehouse 120.

From data warehouse 120, the itinerary data is extracted from data warehouse 120 and transferred 506 to GDR 402. Upon receiving an enrolled cardholder list from price tracking system 506, GDR 402 transfers 506 the itinerary data to tracking server 408 via data exchange system 404, as described above. Tracking server 408 then transmits 508 a confirmation to cardholder 22 that the purchased travel is being monitored for changes in price. The confirmation can be transmitted 508 in any manner, including, but not limited to, email, SMS text message, MMS message, and/or telephone. Tracking server 408 then monitors the price of the purchased travel based on the itinerary data, as described above. When the price of the purchased travel decreases to a level that makes cardholder 22 eligible for a credit and/or refund, tracking server 408 communicates 510 credit or refund eligibility to cardholder 22 in any suitable manner. In the exemplary embodiment, the communication 510 includes instructions for how cardholder 22 can claim the credit and/or refund.

More specifically, when the communication 510 is an email, cardholder 22 can select a link that directs cardholder 22 to user interface 412. Alternatively, cardholder 22 is instructed to visit a website that accesses user interface 412 and/or to call a human concierge at the third party, interchange network 28, and/or issuer 30. After cardholder 22 receives the eligibility communication 510, cardholder 22 claims 512 the credit or refund via user interface 412 and/or a concierge. More specifically, when cardholder 22 accesses user interface 412 by, for example, visiting a website, cardholder 22 can view details regarding the purchased travel item, a current price, a graph of price fluctuations, instructions for claiming the credit or refund, and/or an option to contact the concierge. In one embodiment, a human concierge can be contacted via a real-time chat function of user interface 412, email, and/or the telephone to claim 512 the credit or refund. Alternatively, the concierge is a program accessible through user interface 412 that guides cardholder 22 through the process of claiming 512 the credit and/or refund.

When the concierge is contacted to claim 512 the credit and/or refund, the concierge rebooks 514 the travel at the current, lower price. When airfare is purchased 504, the flight can usually be rebooked 514 under the same conditions, such as a seat number, a departure time, a class, and/or a number of stops. Repurchasing requirements can be tracked such that all the requirements of a rebooking 514 would be accounted. For example, if a rebook 514 requires a seat change, such a requirement is tracked by repurchasing requirements. If the travel cannot be rebooked 514 under the same conditions, except for price, the concierge can explain available options to cardholder 22. When the concierge rebooks 514 the travel, the concierge sends an updated itinerary, credit/refund information, and/or other travel data to cardholder 22. Further, when the purchased travel is rebooked 514 at a lower price, a credit and/or refund in the amount of the difference between the original purchase price and the rebooked price, less any applicable fees, is generated by, for example, merchant 24, and awarded to cardholder 22. Generally, a credit for the difference in price is awarded for future travel by the same traveler with the same merchant 24. Alternatively, a cash refund can be awarded to cardholder 22 by merchant 24 as a check or as a refund on the transaction card account. In one embodiment, a repurchasing credit is awarded to cardholder 22 by merchant 24 as a partial credit.

When cardholder 22 subsequently purchases travel items from the same merchant 24 for the same traveler, the awarded credit is applied 516 to the purchase. At any time, cardholder 22 can access user interface 412 to view 518 upcoming travel, travel history, credit or refund history, loyalty program rewards, and/or any other suitable information. In one embodiment, cardholder 22 can access user interface 412 to purchase travel and redeem credits.

Figure 8:
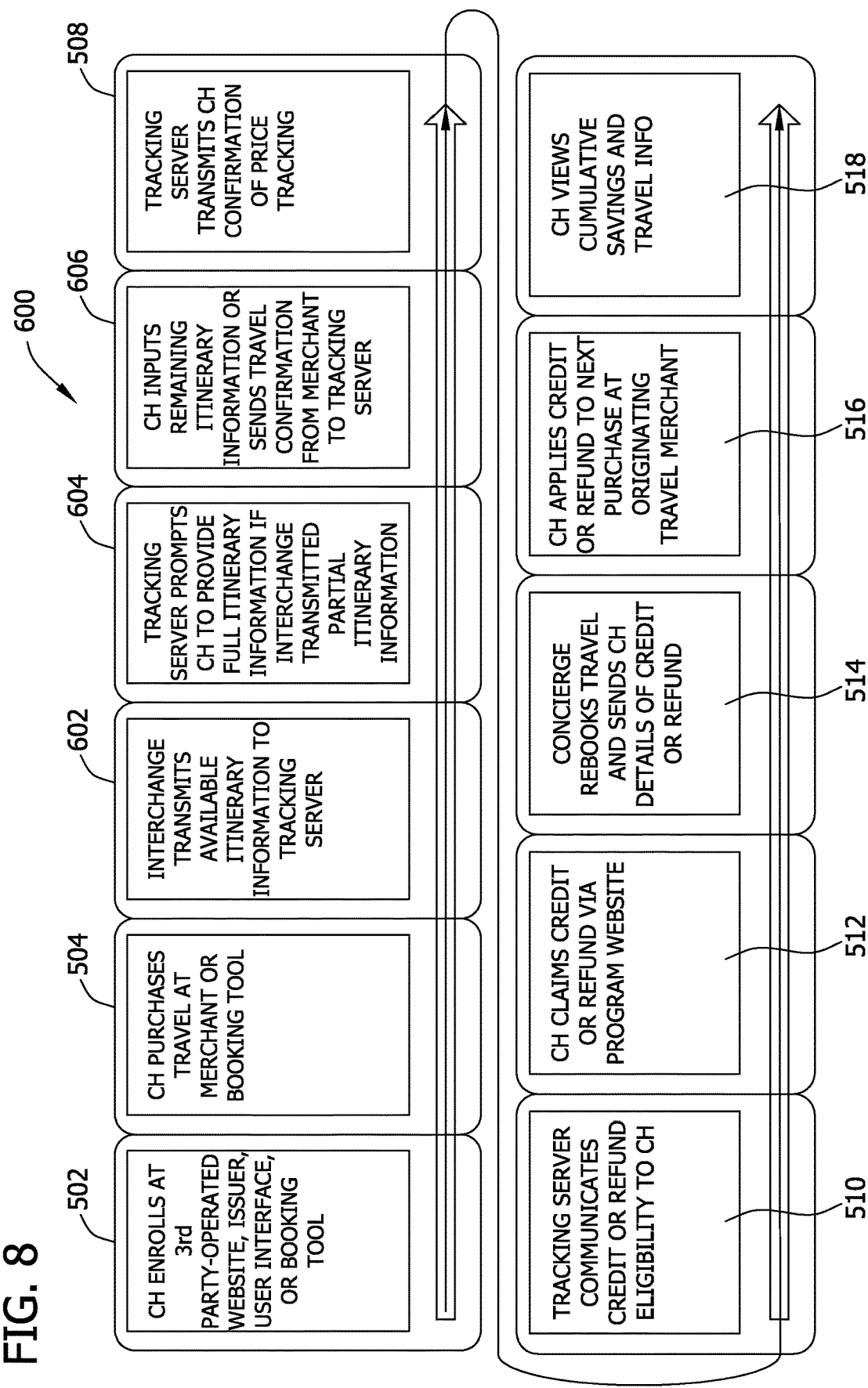

FIG. 8 is a flow diagram illustrating an alternative method 600 performed using transaction and tracking system 400 (shown in FIG. 6). Method 600 is substantially similar to method 500 (shown in FIG. 7), except method 600 is performed when less than full itinerary data is received from the merchant. For example, when cardholder 22 is an individual cardholder rather than a commercial cardholder, merchant 24 may only provide partial itinerary data. As such, steps shown in FIG. 8 are labeled with the same reference numbers used in FIG. 7. Referring to FIGS. 6 and 8, individual cardholder 22 enrolls 502 in the price tracking program and purchases 504 travel as described above. Because cardholder is an individual, rather than a commercial entity, only a portion of an itinerary for the purchased travel is transmitted 602 to parties to the transaction as itinerary data. For example, when individual cardholder 22 purchases a round-trip flight and pays for the airfare using the transaction card, only an itinerary for an outgoing flight is transmitted 602 from merchant 24, through acquirer 26, interchange network 28, data warehouse 120, GDR 402, and data exchange system 404 to price tracking system 406. If merchant 24 transmits 506 (shown in FIG. 7) full itinerary data rather than partial itinerary data, method 500 (shown in FIG. 7) is performed. For example, if individual cardholder 22 uses the booking tool provided by interchange network 28, full itinerary data for the purchase can be transmitted 506. However, when partial itinerary data is transmitted 602, cardholder 22 is prompted 604 to provide the remainder of the itinerary data.

In the exemplary embodiment, the third party transmits a message and/or alert to cardholder 22 prompting 604 cardholder 22 to provide the remaining itinerary data. Alternatively, interchange network 28 uses the booking tool to prompt 604 cardholder 22 to enter additional itinerary data. In the exemplary embodiment, cardholder 22 accesses user interface 412 to input 606 additional itinerary data or sends 606 a travel confirmation from merchant 24 to the third party or the booking tool. When cardholder 22 sends 606 the travel confirmation, the cardholder 22 can forward a confirmation email from merchant 24 to the third party or the booking tool. A processor automatically populates or a human operator manually populates an itinerary with the additional data provided in the confirmation email to complete the itinerary data for the purchased travel. For example, when only the outgoing flight information is transmitted 602 to tracking server 408, an itinerary for the return flight is automatically or manually input 606 into tracking server 408 and/or database 410 to complete the itinerary data.

Once the itinerary data is complete, a confirmation is transmitted 508 to cardholder 22 and the price of the purchased travel is monitored. When cardholder 22 is eligible to receive a credit and/or refund from merchant 24, tracking server 408 communicates 510 such eligibility to cardholder 22. Cardholder 22 claims 512 the credit and/or refund as described above and rebooks 514 the travel. The credit and/or refund can then be applied 516 to future travel. Individual cardholder 22 can also view 518 upcoming travel information, travel history, credit/refund history, travel data, and/or other suitable information using user interface 412.

Referring to FIGS. 7 and 8, when a suitable item and/or service that is not travel related is purchased by a commercial or individual cardholder 22, method 500 and/or 600 is performed using transaction data, and is not limited to the use of itinerary data. As such, the embodiments described herein can tracking a fluctuating characteristic of an item and/or service purchased using a transaction card based on the transaction data related to the purchase.

The above-described systems and methods enable a cardholder to take advantage to price decreases for volatile-priced items and/or services. More specifically, the systems and methods described herein facilitate tracking and/or monitoring price fluctuations using transaction data generated during a transaction conducted using a transaction card. For example, when travel is purchased using the transaction card, itinerary data transmitted to an interchange network during a clearing process is used to track price fluctuations of the purchased travel. As such, the cardholder can take advantage of guaranteed price policies of merchants without personally tracking price changes and/or being familiar with each guaranteed price policy.

A technical effect of the systems and methods described herein includes at least one of: (a) providing a list of enrolled cardholders to a price tracking system; (b) receiving at least partial transaction data associated with a purchased item and/or service; (c) transferring the at least partial transaction data to a data warehouse; (d) receiving the list of enrolled cardholders from the price tracking system via the data exchange system; (e) extracting transaction data for the enrolled cardholder from the data warehouse based on the list of enrolled cardholders; (f) transmitting the extracted transaction data to the price tracking system for tracking a price of the purchased item and/or service based on the tracking data; and (g) tracking a price of the purchased item and/or service based on the transaction data received at the price tracking system.

Exemplary embodiments of methods and systems for tracking a price change for a purchase made using a transaction car are described above in detail. The methods and systems are not limited to the specific embodiments described herein, but rather, components of systems and/or steps of the methods may be utilized independently and separately from other components and/or steps described herein. For example, the methods may also be used in combination with other account systems and methods, and are not limited to practice with only the transaction card account systems and methods as described herein. Rather, the exemplary embodiment can be implemented and utilized in connection with many other data storage and analysis applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-based method for tracking a price change of a purchase made using a transaction card over an interchange network, said method performed by a transaction and tracking system including an interchange computing device, a price tracking computer system including a tracking server in communication with a database, and a global data repository communicatively coupled between the interchange computing device and the price tracking computer system, said method comprising:

providing a client application to a remote user device associated with a cardholder of the transaction card, wherein the remote user device includes a processor and a wireless communication interface, and wherein the client application includes executable instructions for the processor to wirelessly communicate with the price tracking computer system through the wireless interface;

receiving, at the interchange computing device included within the interchange network, transaction data associated with a time-sensitive purchase of an item by the cardholder using the transaction card, wherein the interchange computing device is configured to (i) receive and authorize a plurality of cardholder transactions including the purchase of the item, and (ii) settle funds between a plurality of financial institutions for the plurality of cardholder transactions;

transmitting, from the interchange computing device via the interchange network, an authorization message in response to the purchase of the item;

directing, upon receipt of the authorization message, at least some of the transaction data from the interchange computing device to a data repository, including a purchase price of the item;

extracting, by the global data repository, from the at least some of the transaction data stored in the data repository, itinerary data related to the time-sensitive purchase of the item for periodic transfer to the price tracking computer system;

storing, in the global data repository, the extracted itinerary data;

transmitting, using a data exchange system communicatively coupled between the tracking server and the global data repository, a list of enrolled cardholders from the tracking server to the global data repository;

comparing, by the data exchange system, the list of enrolled cardholders to the extracted itinerary data stored in the global data repository to determine that the itinerary data is associated with an enrolled cardholder;

transmitting, based on the determination that the extracted itinerary data is associated with an enrolled cardholder, the extracted itinerary data from the global data repository to the tracking server using the data exchange system;

electronically monitoring, by the tracking server of the price tracking computer system, published asking prices of the item at each periodic transfer of the extracted itinerary data for comparing with the purchase price;

determining, by the tracking server of the price tracking computer system, that at least one published asking price is lower than the purchase price by comparing the purchase price with the periodically monitored published asking prices; and transmitting over a wireless communication channel, from the price tracking computer system to the wireless interface of the user device, based on the step of determining, a price change alert message indicating a decrease from the purchase price and including a selectable link for obtaining a credit or refund for a portion of the decrease, wherein selection of the selectable link included in the price change alert message causes the user device to connect to the price tracking computer device over the Internet and to display a user interface generated by the tracking server of the price tracking computer system.

2. A computer-based method in accordance with claim 1, wherein the purchased item is a travel related item including at least one of airfare, train fare, bus fare, hotel stay, and car rental.

3. A computer-based method in accordance with claim 1, wherein the extraction of itinerary data further comprises receiving partial itinerary data associated with the purchase of a travel item, and wherein the method further comprises:
prompting the cardholder to provide supplemental itinerary data in addition to the received partial itinerary data to generate full itinerary data.

4. A computer-based method in accordance with claim further comprising:
determining that at least one of the cardholder, the transaction card, and the purchased item are eligible for price tracking services provided by the price tracking computer system, the determination being performed by the interchange network.

5. A computer-based method in accordance with claim 1, further comprising:
storing a merchant change fee within the database;
comparing, by the tracking server of the price tracking computer system, the stored merchant change fee to a price difference between the purchase price of the item and at least one of the periodically monitored published asking prices of the item; and
transmitting the price change alert message when the price difference is greater than the merchant change fee.

6. A computer-based method in accordance with claim 1 further comprising:
determining, from the decrease from the purchase price, a price difference between the purchase price of the item and the current asking price of the item, wherein the determination is performed by the tracking server of the price tracking computer system;
determining that the cardholder is eligible for a repurchasing credit based at least in part on the price difference;
providing the price change alert message to the user device including an amount of the repurchasing credit and repurchasing requirements; and
receiving repurchasing instructions from the cardholder indicating that the cardholder agrees to (i) repurchase the item at the current asking price subject to the repurchasing requirements, and (ii) receive the repurchasing credit.

7. A computer-based method in accordance with claim 6, further comprising:
applying the repurchasing credit to an account associated with the cardholder and the transaction card over the interchange network after receiving the repurchasing instructions.

8. A computer system for tracking a price change of a purchase made using a transaction card over an interchange network, said computer system comprising an interchange computing device, a price tracking computer system including a tracking server in communication with a database, and a global data repository communicatively coupled between the interchange computing device and the price tracking computer system, said computer system configured to:
provide a client application to a remote user device associated with a cardholder of the transaction card, wherein the remote user device includes a processor and a wireless communication interface, and wherein the client application includes executable instructions for the processor to wirelessly communicate with the price tracking computer device through the wireless interface;
receive transaction data from an interchange computing device included within the interchange network, the transaction data associated with a time-sensitive purchase of an item by the cardholder using the transaction card over the interchange network, the transaction data including a purchase price of the item, wherein the interchange computing device is configured to (i) receive and authorize a plurality of cardholder transactions including the purchase of the item, and (ii) settle funds between a plurality of financial institutions for the plurality of cardholder transactions;
direct at least some of the transaction data from the interchange computing device to a data repository, including a purchase price of the item;
extract, by the global data repository, from the at least some of the transaction data stored in the data repository, itinerary data related to the time-sensitive purchase of the item for periodic transfer to the price tracking computer system;

store, in the global data repository, the extracted itinerary data;

transmit, using a data exchange system communicatively coupled between the tracking server and the global data repository, a list of enrolled cardholders from the tracking server to the global data repository;

compare, by the data exchange system, the list of enrolled cardholders to the extracted itinerary data stored in the global data repository to determine that the itinerary data is associated with an enrolled cardholder;

transmit, based on the determination that the extracted itinerary data is associated with an enrolled cardholder, the extracted itinerary data from the global data repository to the tracking server using the data exchange system;

electronically monitor, by the tracking server of the price tracking computer system, published asking prices of the item at each periodic transfer of the extracted itinerary data for comparing with the purchase price;

determine, by the tracking server of the price tracking computer system, that at least one published asking price is lower than the purchase price by comparing the purchase price with the periodically monitored published asking prices; and transmit over a wireless communication channel, from the price tracking computer system to the wireless interface of the user device, based on the step of determining, a price change alert message indicating a decrease from the purchase price and including a selectable link for obtaining a credit or refund for a portion of the decrease, wherein selection of the selectable link included in the price change alert message causes the user device to connect to the price tracking computer device over the Internet and to display a user interface generated by the tracking server of the price tracking computer system.

9. The computer system in accordance with claim 8, wherein the purchased item is a travel related item including at least one of airfare, train fare, bus fare, hotel stay, and car rental.

10. The computer system in accordance with claim 8, wherein the extracted itinerary data includes partial itinerary data associated with the purchased travel item, and said computer is further configured to prompt the cardholder to provide supplemental itinerary data in addition to the received partial itinerary data to generate full itinerary data for the purchased travel item.

11. The computer system in accordance with claim 8, wherein said computer system is further configured to:
   determine that the cardholder is eligible for price tracking services; and
   transmit the price change alert message to the user device each time the purchase price of the item is more than the current asking price of the item.

12. The computer system in accordance with claim 8, wherein said computer system is further configured to:
   store a merchant change fee within the database;
   compare the stored merchant change fee to a price difference between the purchase price of the item and at least one of the periodically monitored published asking prices of the item; and
   transmit the price change alert message when the price difference is greater than the merchant change fee.

13. The computer in accordance with claim 8, wherein said computer system is further configured to:
   determine, from the decrease from the purchase price, a price difference between the purchase price of the item and the current asking price of the item;
   determine that the cardholder is eligible for a repurchasing credit based at least in part on the price difference;
   provide the price change alert message to the cardholder including an amount of the repurchasing credit and repurchasing requirements; and
   receive repurchasing instructions from the cardholder indicating that the cardholder agrees to (i) repurchase the item at the current asking price subject to the repurchasing requirements, and (ii) receive the repurchasing credit.

14. The computer system in accordance with claim 13, wherein said computer system is further configured to instruct the interchange network to apply the repurchasing credit to an account associated with the cardholder and the transaction card after receiving the repurchasing instructions.

15. A network-based system for tracking a price change of an item purchased by a cardholder using a transaction card over an interchange network, said network-based system comprising:
   a data warehouse for storing transaction data;
   an interchange computing device included within the interchange network in communication with said data warehouse;
   a global data repository; and
   a price tracking computer system in communication with said data warehouse, said price tracking computer system comprising a tracking server in communication with a database, said global data repository communicatively coupled between said interchange computing device and said price tracking computer system, said network-based system configured to:
      provide a client application to a remote user device associated with the cardholder, wherein the remote user device includes a processor and a wireless communication interface, and wherein the client application includes executable instructions for the processor to wirelessly communicate with the price tracking computer device through the wireless interface;
      receive, from the interchange computing device, transaction data associated with a time-sensitive purchase of the item by the cardholder using the transaction card, wherein the transaction data includes a purchase price of the item, wherein the interchange computing device is configured to (i) receive and authorize a plurality of cardholder transactions including the purchase of the item, and (ii) settle funds between a plurality of financial institutions tier the plurality of cardholder transactions;
      direct at least some of the transaction data from the interchange computing device to the data repository, including a purchase price of the item;
      extract, by the global data repository, from the at least some of the transaction data stored in the data repository, itinerary data related to the time-sensitive purchase of the item for periodic transfer to the price tracking computer system;
      store, in the global data repository, the extracted itinerary data;
      transmit, using a data exchange system communicatively coupled between the tracking server and the global data repository, a list of enrolled cardholders from the tracking server to the global data repository;

compare, by the data exchange system, the list of enrolled cardholders to the extracted itinerary data stored in the global data repository to determine that the itinerary data is associated with an enrolled cardholder;

transmit, based on the determination that the ex acted itinerary data is associated with an enrolled cardholder, the extracted itinerary data from the global data repository to the tracking server using the data exchange system;

electronically monitor, by the tracking server of the price tracking computer system, published asking prices of the item at each periodic transfer of the extracted itinerary data for comparing with the purchase price;

determine, by the tracking server of the price tracking computer system, that at least one published asking price is lower than the purchase price by comparing the purchase price with the periodically monitored published asking prices; and transmit over a wireless communication channel, from the price tracking computer system to the wireless interface of the user device, based on the step of determining, a price change alert message indicating a decrease from the purchase price and including a selectable link for obtaining a credit or refund for a portion of the decrease, wherein selection of the selectable link included in the price change alert message causes the user device to connect to the price tracking computer device over the Internet and to display a user interface generated by the tracking server of the price tracking computer system.

16. A network-based system in accordance with claim 15, wherein the purchased item is a travel related item including at least one of airfare, train fare, bus fare, hotel stay, and car rental.

17. A network-based system in accordance with claim 15, wherein the database stores a merchant change fee, and wherein said price tracking computer system is further configured to compare the stored merchant change fee to a price difference between the purchase price of the item and at least one of the periodically monitored published asking prices of the item, and transmit the price change alert message when the price difference is greater than the merchant change fee.

18. A network-based system in accordance with claim 15, wherein said price tracking computer system is further configured to:

determine, from the decrease from the purchase price, a price difference between the purchase price of the item and the current asking price of the item;

determine that the cardholder is eligible for a repurchasing credit based at least in part on the price difference;

provide the price change alert message to the cardholder including an amount of the repurchasing credit and repurchasing requirements; and receive repurchasing instructions from the cardholder indicating that the cardholder agrees to (i) repurchase the item at the current asking price subject to the repurchasing requirements, and (ii) receive the repurchasing credit.

19. One or more computer-readable media having computer-executable instructions embodied thereon, wherein when executed by a computer device, the computer-executable instructions cause the computer device to:

provide a client application to a remote user device associated with a cardholder of a transaction card from an interchange network, wherein the remote user device includes a processor and a wireless communication interface, and wherein the client application includes executable instructions for the processor to wirelessly communicate with the computer device through the wireless interface;

receive transaction data associated with a time-sensitive purchase of an item made by the cardholder using the transaction card from an interchange computing device included within the interchange network, wherein the interchange computing device is configured to (i) receive and authorize a plurality of cardholder transactions including the purchase of the item, and (ii) settle funds between a plurality of financial institutions for the plurality of cardholder transactions;

receive, from the interchange computing device, an authorization message transmitted in response to the purchase of the item;

directing, upon receipt of the authorization message, at least some of the transaction data from the interchange computing device to a data repository, including a purchase price of the item;

extract, by a global data repository communicatively coupled between the interchange computing device and a price tracking computer system including a tracking server in communication with a database, from the at least some of the transaction data stored in the data repository, itinerary data related to the time-sensitive purchase of the item for periodic transfer to the price tracking computer system;

store, in the global data repository, the extracted itinerary data;

transmit, using a data exchange system communicatively coupled between the tracking server and the global data repository, a list of enrolled cardholders from the tracking server to the global data repository;

compare, by the data exchange system, the list of enrolled cardholders to the extracted itinerary data stored in the global data repository to determine that the itinerary data is associated with an enrolled cardholder;

transmit based on the determination that the extracted itinerary data is associated with an enrolled cardholder, the extracted itinerary data from the global data repository to the tracking server using the data exchange system;

electronically monitor, by the tracking server of the price tracking computer system, published asking prices of the item at each periodic transfer of the extracted itinerary data for comparing with the purchase price;

determine, by the tracking server of the price tracking computer system, that at least one published asking price is lower than the purchase price by comparing the purchase price with the periodically monitored published asking prices; and transmit over a wireless communication channel, from the tracking server of the price tracking computer system to the wireless interface of the user device, based on the step of determining, a price change alert message indicating a decrease from the purchase price and including a selectable link for obtaining a credit or refund for a portion of the decrease, wherein selection of the selectable link included in the price change alert message causes the user device to connect to the tracking server of the price tracking computer system over the Internet and to display a user interface generated by the tracking server of the price tracking computer device.

\* \* \* \* \*

UNITED STATES PATENT AND TRADEMARK OFFICE
CERTIFICATE OF CORRECTION

PATENT NO. : 10,685,384 B2
APPLICATION NO. : 13/345448
DATED : June 16, 2020
INVENTOR(S) : Kemp et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1397 days.

Signed and Sealed this
Seventh Day of February, 2023

Katherine Kelly Vidal
*Director of the United States Patent and Trademark Office*